Patented Mar. 22, 1932

1,850,220

UNITED STATES PATENT OFFICE

BRUNO WENDT AND ALFRED FROHLICH, OF DESSAU IN ANHALT, GERMANY, ASSIGNORS TO AGFA ANSCO CORPORATION, OF BINGHAMTON, NEW YORK, A CORPORATION OF NEW YORK

PHOTOGRAPHIC BLEACHING-OUT LAYER

No Drawing. Application filed February 12, 1931, Serial No. 515,402, and in Germany February 28, 1930.

Our present invention relates to a new process of manufacturing photographic bleaching-out layers as used in color photography and to the new photographic materials obtainable by this process.

The use of pyronine dyes for the preparation of photographic bleaching-out layers is known. These dyes, however, have the drawback that they do not bleach to pure white.

According to this invention, layers are obtained which bleach-out to a comparatively pure white, and also have the advantage of an increased bleaching-out velocity, by using dyes in which the oxygen of the pyronine nucleus have been exchanged for sulfur or selenium.

Suitable dyes are, for instance:—3.6-diamino-thioxanthonium chloride, yellowish-red,

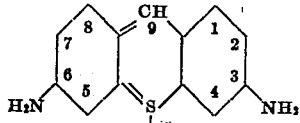

3.6-tetramethyldiamino-9-cyanothioxanthonium chloride, blue,

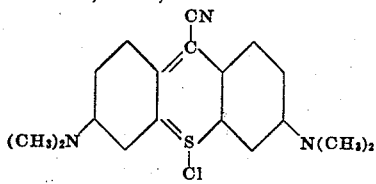

2.7-dimethyl-3.6-tetraethyldiamino-9-cyanoselenoxanthonium chloride, blue (made analogously to the method indicated in "Berichte der deutschen chemischen Gesellschaft", Vol. 46, page 1931),

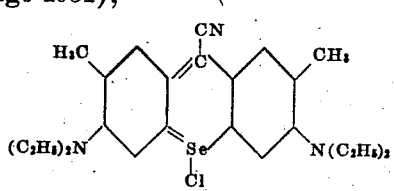

1.4.5.8-tetramethyl-3.6-diaminoselenoxanthonium chloride, purple (made according to "Chemisches Zentralblatt" 1924, Vol. I, page 2782),

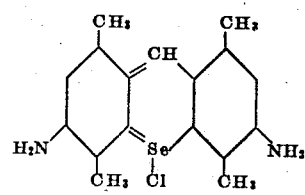

5.8-dimethyl-3-dimethylamino-6-aminoselenoxanthonium chloride, purple, absorption maximum 556µµ (made according to "Chemisches Zentralblatt" 1926, Vol. III, page 677 from 2.5-dimethyl-4-amino-4'-dimethylamino-diphenyl-methane, itself (made according to Example 8 of German Specification No. 107,718 and melting at 108° C.),

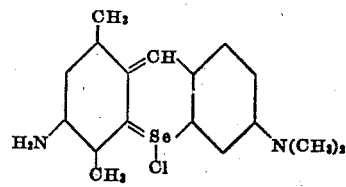

1-chloro-3-amino-6-dimethylaminoselenoxanthonium chloride, red violet, absorption maximum 561 µµ (made from 2-chloro-4-amino-4'-dimethylaminodiphenylmethane, itself made according to Example 8 of German Specification No. 107,718, and sodium selenite in fuming sulfuric acid containing 15 per cent of sulfur trioxide) worked up as set forth in "Chemisches Zentralblatt" 1920, Vol. III, page 677,

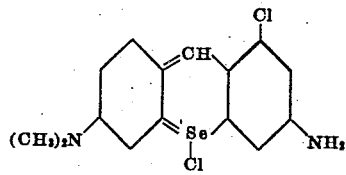

2-methoxy-3-amino-6-dimethylaminoselenoxanthonium chloride, purple, absorption maximum 559 µµ (made from 3-methoxy-4-amino-4'-dimethylaminodiphenylmethane, itself made according to Example 8 of the German Specification No. 107,718 and melting at 93° C., and sodium selenite in fuming sulfuric acid containing 12 per cent of sulfur trioxide). The product is worked up as set forth in "Chemisches Zentralblatt" 1920, Vol. III, page 667,

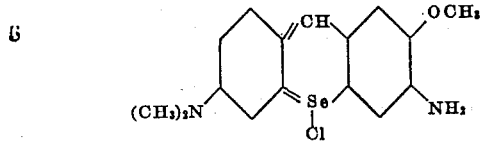

Such bleaching-out dyes are made into bleaching-out layers, in the same manner as the known pyronine dyes, with aid of the usual sensitizers. Thus we may apply to a suitable support such as for instance, paper or a celluloid film, a preparation containing about 1 to 3 mg. of the dye and 1 gram of a binding agent calculated on 100 cm$^2$ of the surface of the support. As a binding agent, we may use, for instance, gelatin, nitrocellulose, acetyl cellulose or cellulose ethers, or preferably a mixture of such binding agents from which one component dissolves the dye and the other, in which the dye is insoluble, swells in the fixing agent used to remove the sensitizer from the light-sensitive layer. As a sensitizer we may use, for instance, alkyl thiourea in a quantity of about 0.12 grams, or diethylalkylthiourea in a quantity of about 0.06 grams per 100 cm$^2$ of the light-sensitive surface.

The pictures printed by illuminating the light-sensitive materials described, behind a positive, are fixed by washing out the sensitizer from the light-sensitive layer. For this purpose we may use, for instance, water or a diluted alcohol in the case of gelatin used as a binding agent. An extraordinarily good fixation is obtainable by treating the light-sensitive material with an alkali metal salt of borofluohydric acid, whereat a borofluohydric salt of the thioxanthonium or selenoxanthonium dye is formed which is insoluble in the solvents used for the removal of the sensitizer. Thus, a fading or blurring of the color pictures is avoided.

What we claim is:

1. A process of manufacturing photographic bleaching-out layers which comprises incorporating a xanthonium dye of the group consisting of thioxanthonium and selenoxanthonium dyes, and a sensitizer into a binding agent and applying the light-sensitive preparation on a support.

2. Light-sensitive bleaching-out layers containing a xanthonium dye of the group consisting of thioxanthonium and selenoxanthonium dyes.

In testimony whereof, we affix our signatures.

BRUNO WENDT.
ALFRED FROHLICH.